United States Patent [19]

Wilks

[11] Patent Number: 5,825,368
[45] Date of Patent: Oct. 20, 1998

[54] METHOD AND APPARATUS FOR RENDERING GRAPHICAL COMPONENTS ON A DISPLAY UTILIZING GEOMETRIC CONSTRAINTS

[75] Inventor: Allan R. Wilks, Scotch Plains, N.J.

[73] Assignee: Lucent Technologies Inc., Murray Hill, N.J.

[21] Appl. No.: 579,498

[22] Filed: Dec. 27, 1995

[51] Int. Cl.$^6$ .............................. G06T 3/00; G06T 3/20; G06T 3/40; G06T 3/60

[52] U.S. Cl. ................... 345/440; 345/437; 345/438; 345/439; 345/441

[58] Field of Search ........................................... 395/140

[56] References Cited

U.S. PATENT DOCUMENTS

| | | | |
|---|---|---|---|
| 4,800,510 | 1/1989 | Vinberg et al. | 395/140 |
| 5,249,265 | 9/1993 | Liang | 395/356 |
| 5,307,451 | 4/1994 | Clark | 395/133 |
| 5,371,845 | 12/1994 | Newell et al. | 395/133 |
| 5,452,411 | 9/1995 | Hidaka | 395/141 |
| 5,475,803 | 12/1995 | Stearns et al. | 395/136 |
| 5,544,301 | 8/1996 | Orton et al. | 395/342 |
| 5,611,035 | 3/1997 | Hall | 395/140 |

OTHER PUBLICATIONS

Hearn et al., Computer Graphics, Prentice Hall, Inc., pp. 184–209 1994.
Foley et al., Computer Graphics Principles and Practice, Addison–Wesley Publishing Company, pp. 208–210, 656–663, 1993.

*Primary Examiner*—Mark K. Zimmerman
*Assistant Examiner*—Jai-Hee Choi

[57] ABSTRACT

A method and apparatus for rendering statistical graphics which utilizes geometric constraints and bounding boxes to compute coordinate transformations at the time a graphical object is rendered. The invention transforms coordinates in an intrinsic coordinate system of a drawing element into coordinates in an absolute coordinate system of a computer display device. The geometric constraints tie the drawing elements together and define linear equality constraints between the initially unknown parameters while allowing computation of rotation and reflection parameters in advance and independently of the remaining initially unknown parameters. Rendering bounding boxes are used to define linear inequality constraints that require the rendering bounding boxes to be completely confined within a display bounding box of known size. Using the linear equality constraints, the linear inequality constraints and a cost function, the values of the remaining initially unknown parameters are computable such that both the linear equality constraints and the linear inequality constraints are simultaneously satisfied.

5 Claims, 4 Drawing Sheets

METHOD AND APPARATUS FOR RENDERING GRAPHICAL COMPONENTS ON A DISPLAY UTILIZING GEOMETRIC CONSTRAINTS

BACKGROUND OF THE INVENTION

1. Field of the Invention

The present invention relates generally to computer-based drawing systems, and more particularly to a statistical graphics drawing system utilizing geometric constraints in the rendering of graphical objects.

2. Background

In order to produce drawings on a display device, such as a video terminal or printer, computer-based drawing systems typically perform coordinate transformations from a first coordinate system of a graphical object to be displayed to a second coordinate system of the display device. In order to perform the coordinate transformations, certain parameters that define the coordinate transformations need to be determined, such as size and position of the drawing relative to the display. Statistical graphics drawing systems of the prior art simplify the determination of these parameters by reserving areas of the display where various component pieces of a plot will be generated. In other words, these prior art statistical graphics systems generally predetermine the size and position of the plot in order to facilitate the coordinate transformations.

Predetermining the size and position of the plot, however, has a major drawback in that it makes the plot inflexible to changes. Once areas of the display are reserved by the prior art statistical graphics systems, any modification to the size and position of the reserved areas involves determining the drawing parameters and performing coordinate transformations once again.

As would be understood, a goal for most users of statistical graphics systems is to maximize the utilization of display area on a given display device when rendering a statistical graph. As mentioned, conventional systems for statistical graphics will automatically set aside areas on the display for various components of the statistical graph. For example, in an exemplary statistical graph, one area of the display may be set aside for points of a graph and another for axes, labels and titles. If, however, no axes, labels and titles are requested by the user, large amounts of space are left unused around the edge of the plot. Such a result is generally considered undesirable. Any re-manipulation of the plot, however, will again require the drawing parameters and coordinate transformations to be calculated, tending to inconvenience the user. Accordingly, there is a need for a more flexible methodology used in the creation of statistical graphics that does not require pre-specification of areas in order to produce a graphical display while maximizing utilization of display area.

SUMMARY OF THE INVENTION

The present invention discloses a method and apparatus for rendering graphical components on a display by using geometric constraints. The present invention renders the graphical components by determining a set of geometric constraints for relating intrinsic coordinate systems of graphical components to an absolute coordinate system of the display, wherein the intrinsic coordinate systems have initially unknown transformation parameters, and the absolute coordinate system has predetermined transformation parameters. A non-shear coordinate transformation is then performed for mapping intrinsic coordinates in the intrinsic coordinate systems to absolute coordinates in the absolute coordinate system. The geometric constraints of the present invention include one or more linear equality constraints that define the relationships between the transformation parameters, such as rotation, scale, reflection and translation, of the coordinate systems involved in the geometric constraints.

Advantageously, the non-shear coordinate transformation enables the initially unknown transformation parameters of the intrinsic coordinate systems to be calculated when the graphical components are being rendered. Specifically, the linear equality constraints allow computation of the rotation and reflection parameters of the intrinsic coordinate systems in advance and independently of the scale and translation parameters of the intrinsic coordinate systems using the predetermined transformation parameters of the absolute coordinate system. Subsequently, the scale and translation parameters are determined by the present invention using the geometric constraints, predetermined transformation parameters of the absolute coordinate system, and possibly the rotation and reflection parameters such that the linear equality constraints are simultaneously satisfied.

The present invention also defines bounding boxes for the graphical components using rendered width and height information determined from rendering data. The rendering bounding boxes include linear inequality constraints that relate the graphical components to the display. Preferably, the rendering bounding boxes are confined within a display bounding box such that the geometric constraints are satisfied while maximizing utilization of the display.

BRIEF DESCRIPTION OF THE DRAWINGS

For a better understanding of the present invention, reference may be had to the following description of exemplary embodiments thereof, considered in conjunction with the accompanying drawings, in which.

DETAILED DESCRIPTION

Figure 1:
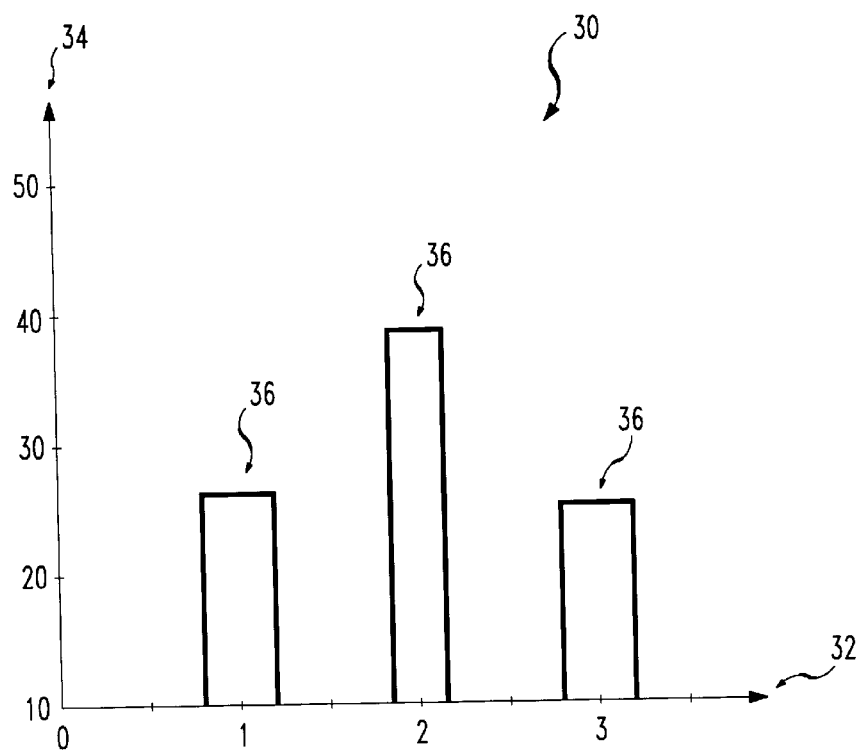
FIG. 1 depicts a sample graphical object for illustrating the present invention.

The present invention discloses a novel method for the efficient rendering of graphical objects on a computer display device. Graphical objects, such as statistical graphs or plots, are described using geometric constraints to relate component pieces of the graphical object to one another. Referring to FIG. 1, there is shown an exemplary graphical object depicting a plot of a bar chart 30. As can be seen, the bar chart 30 includes an x-axis 32, y-axis 34 and bars 36. The present invention will be described with regard to the bar chart 30 of FIG. 1, however, this should not be construed to limit the present invention in any manner to only bar charts or statistical graphs.

Figure 1A:
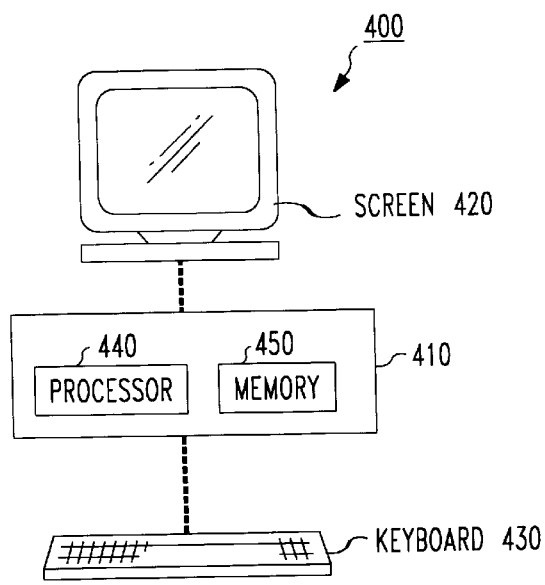
FIG. 1A shows an exemplary representation of a computing device for a computer graphics drawing system and which may be utilized in connection with the present invention.

Referring to FIG. 1A, there is shown an exemplary representation of a computing device 400, in connection with which the present invention may be practiced. As shown, the computing device includes a processing unit 410, display device 420, for example, but not limited to, a video display terminal screen or printer, and an input device 430, for example, a keyboard, mouse, etc. As would be understood, the processing unit includes among other things one or more processors 440 and associated memory 450. The computer executes commands based on software instructions stored, for example, in memory 450. Based on input from a user, the computing device in connection with associated software, is operable to generate a specific set of signals desired by the user, which may include, for example, the preparation and rendering of drawings on a display device. As would be understood the computing device may take the form of a personal computer or other like device, and may be a stand-alone workstation or part of a networked or centralized computer system. Additionally, as would be understood, the present invention may take the form of a software program for such a computing device. In a preferred embodiment, the present invention operates in conjunction with the well-known UNIX operating system.

Figure 2:
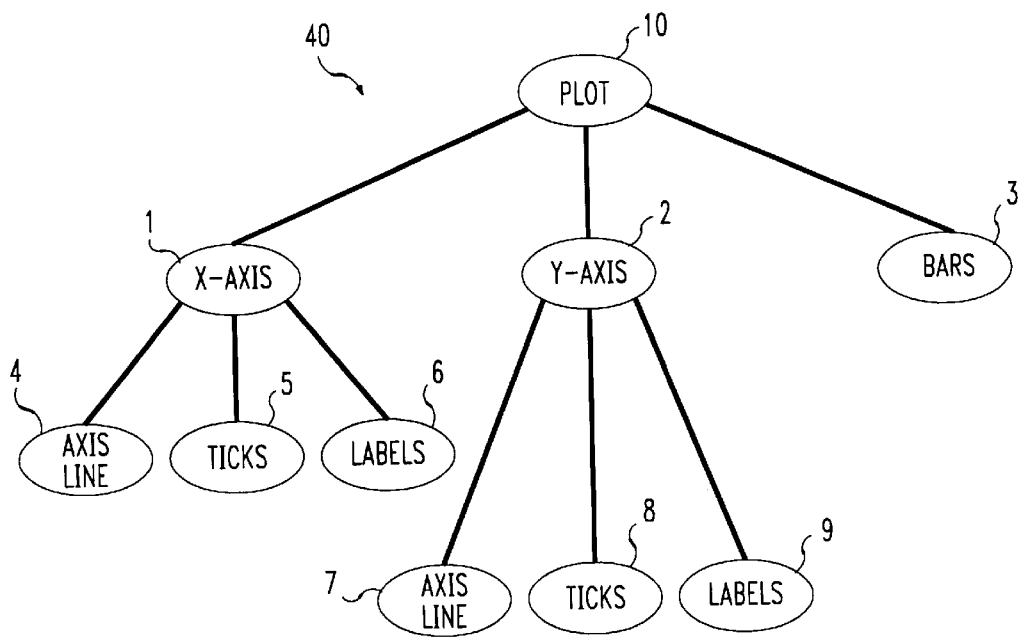
FIG. 2 depicts an exemplary hierarchical representation of a graphical object structure for the sample graphical object in FIG. 1.

The present invention method breaks down each component piece of a graphical object into successively more refined pieces thereby defining a hierarchal structure. Referring to FIG. 2, there is shown an exemplary hierarchical representation of a graphical object structure 40 for the bar chart 30 in FIG. 1. The graphical object structure 40 comprises a plurality of nodes connected by branches, wherein each node represents a component piece of the graphical object. A top node 10 represents the entire bar chart 30. Initially, the bar chart 30 can be described as comprising three main component pieces: bars 36, y-axis 34 and x-axis 32. These component pieces are represented in a second level of the graphical object structure 40 by nodes 3, 2, and 1, respectively. The y-axis 34 and x-axis 32 of FIG. 1 can be further described as including axis lines, ticks and labels, which are represented in a third level of the graphical object structure 40 as axis line nodes 7, 4, tick nodes 8, 5 and label nodes 9, 6, respectively. The component pieces (or nodes) are tied together by geometric constraints as will be explained.

The bottom-most nodes of each set of branches of the graphical object structure 40, e.g., label nodes 9, 6, are called leaves. These nodes represent the most basic component pieces of the graphical object. Each leaf is a drawing element containing a set of drawing instructions. The set of drawing instructions specifies the object to be drawn, a location to draw the object and possibly how to draw or present the object. Table I in Appendix A illustrates an exemplary set of drawing instructions for some of those drawing elements or leaves depicted in FIG. 2. Note that each leaf may contain several items to render, for example, the bar leaf will have three bars to draw on the display.

TABLE I

| LEAF | Bars | Axis Line | Labels | Ticks |
|---|---|---|---|---|
| DRAWING PRIMITIVE | Rectangles | Segments | Text | Segments |
| GEOMETRIC INFORMATION | $(x^1,y^1), (x^{1'},y^{1'})$ $(x^2,y^2), (x^{2'},y^{2'})$ $(x^3,y^3), (x^{3'},y^{3'})$ | $(x^1,y^1),$ $(x^{1'},y^{1'})$ | $(x^1,y^1,s^1)$ $(x^2,y^2,s^2)$ ... $(x^n,y^n,s^n)$ | $(x^1,y^1), (x^{1'},y^{1'})$ $(x^2,y^2), (x^{2'},y^{2'})$ ... $(x^n,y^n), (x^{n'},y^{n'})$ |
| RENDERING | linewidth | linewidth | pointsize, textadjust | marksize, markrotation |

TABLE I-continued

| LEAF | Bars | Axis Line | Labels | Ticks |
|---|---|---|---|---|
| INFORMATION | | | text-rotation, font | |

Note that the superscripts do not denote a power factor. Rather the superscripts denote item z of the leaf (or drawing element), where $z=1, \ldots, n$. The appended superscript ' denotes other coordinate pairs necessary to render the drawing primitive.

Drawing instructions in each leaf relate to drawing primitives, geometric data and possibly rendering data. A drawing primitive, generally, is a function for drawing an object on the display device. In the present invention, a drawing primitive does not merely describe a single object, but rather collections of similar objects, such as polylines, arcs, text and marks. An exemplary list of drawing primitives used in connection with the present invention method are shown in Table II of Appendix B. As would be understood, other drawing primitives, such as curves, hexagons, triangles, etc., may also be included.

TABLE II

| DRAWING PRIMITIVE | DESCRIPTION |
|---|---|
| polyline: $(x^z,y^z) - (x^{z'},y^{z'})$ $z = 1, \ldots, n$ | A polylines is a linear spline; a sequence of points connected by line segments. The input data is the sequence of points. |
| polygons: $(x^z,y^z), (x^{z'},y^{z'})$ $z = 1, \ldots, n$ | A polygon is a polyline with the last point connected to the first. The input data is the sequence of points. |
| segments: $(x^z,y^z), (x^{z'},y^{z'})$ $z = 1, \ldots, n$ | A segment is a line segment with both endpoints specified. |
| rectangles: $(x^z,y^z), (x^{z'},y^{z'})$ $z = 1, \ldots, n$ | A rectangle is a polygon where the two points for each rectangle are the coordinates of two opposite corners. |
| arcs: $(c^{xz},c^{yz}), r^z, (a^s,a^z)$ $z = 1, \ldots, n$ | An arc is a circular arc. The zth arc is the part of the circle that is centered at $(c^{xz},c^{yz})$ with a radius $r^z$ that starts at angle $a^z$ degrees, proceeds counter-clockwise, and ends at angle $a^z$ degrees. |
| text: $(x^z,y^z), s^z$ $z = 1, \ldots, n$ | Text allows text string $s^z$ to be plotted at position $(x^z,y^z)$. |
| marks: $(x^z,y^z),$ $z = 1, \ldots, n$ | A mark is a symbol. The mark is plotted at the specified position. |

Note that the superscripts do not denote a power factor. Rather the superscripts denote item z of the leaf (or drawing element), where $z=1, \ldots, n$. The appended superscript ' denotes other coordinate pairs necessary to render the drawing primitive.

Each leaf of the graphical object structure 40 has one associated drawing primitive. The present invention uses the drawing primitives of Table II to draw the bar, axis line, label and tick component pieces of the plot 30 shown in FIG. 1 on a display. For example, rectangle drawing primitives are used to draw the bar component pieces of the plot 30.

Geometric data, another form of data found in the drawing instructions, is information that specifies how to position and possibly size the drawing primitives in a coordinate system intrinsic to the drawing element. Specifically, geometric data consists of sets of one or more coordinate pairs, such as endpoints, arc centers, corners, etc. Each item of the leaf has a corresponding set of geometric data. Some drawing primitives, such as text, need only one coordinate pair to position the drawing primitive. Other drawing primitives need more than one coordinate pair, such as rectangles and segments.

Rendering data, which may also be included in the drawing instructions, gives specific instructions for presenting the drawing primitive, such as how thick to draw lines, what point size to use for text, how many degrees to rotate text, etc. The rendering data controls how every item in a leaf is drawn on the display device.

All nodes of the graphical object that are not leaves, for example, the x-axis and y-axis nodes 1, 2 of the second level in FIG. 2 are called interior nodes. Unlike leaves, interior nodes have no drawing primitives associated with them. In a similar fashion to leaves, however, interior nodes may contain rendering data. Any rendering data applies recursively to all descendant nodes of an interior node, unless overridden by rendering data in a lower interior node or leaf.

COORDINATE TRANSFORMATIONS

As mentioned previously, each leaf of the graphical object structure has geometric data that exists in an intrinsic coordinate system i specific to the drawing element of that leaf, where i=1, ..., N. In order to render a graphical object onto a display, it is necessary to relate each intrinsic coordinate system i to that of an absolute coordinate system 0 of the display. The absolute coordinate system will be fixed and known in advance. For example, a typical choice would be to put (0, 0) at the lower left corner of the display and to specify that x increases from left to right, y increases from bottom to top and one unit in both the x and y directions is, say, one inch. Relating each intrinsic coordinate system i gives intrinsic coordinates meaning as absolute coordinates thereby allowing the component pieces to be properly generated on the display with respect to each other and the display. This mapping from intrinsic coordinate system i to the absolute coordinate system is a coordinate transformation $T_i$ performed for each leaf of the graphical object structure.

The present invention allows only affine or parallel-like coordinate transformations. That is, if $(x^i, y^i)$ is a coordinate pair in intrinsic coordinate system i and $(x^0, y^0)$ is a corresponding coordinate pair in the absolute coordinate system, then the coordinate transformation between these pairs are related as follows:

$$x^0 = a^i x^i + b^i y^i + \tau_x^i \quad \text{equation} \quad (1)$$

$$y^0 = c^i x^i + d^i y^i + \tau_y^i \quad \text{equation} \quad (2)$$

where $a^i$, $b^i$, $c^i$, $d^i$, $\tau_x^i$ and $\tau_y^i$ represent initially unknown transformation parameters for intrinsic coordinate system i. Thus, it is necessary to determine the transformation parameters before the coordinate transformations can be performed.

The process of determining the unknown transformation parameters in a coordinate transformation $T_i$ amounts to solving an optimization problem. This problem is difficult to solve because it is not linear. That is, to accomplish the transformation, a pair of arbitrary, affinely-related coordinate systems are generically rotated with respect to each other and this leads to non-linear constraints. Generally, a non-linear transformation results in a shear, i.e., non-orthogonal, transformation which is undesirable because it does not permit formulation of the problem in a linear programming setting.

In accordance with the present invention, a simplifying assumption is made which allows the problem to be formulated in a linear programming setting. The assumption is that there be a non-shear, i.e., orthogonal, transformation such that all vectors in an intrinsic coordinate system i be rotated the same amount. This gives the non-shear condition $a^i b^i + c^i d^i = 0$, as would be understood by a person skilled in the art. Under this condition, it is possible to determine a unique angle θ through which all vectors are rotated, such that the transformation equations (1) and (2) may be rewritten as:

$$x^0 = \sigma_x^i \rho_x^i x^i \cos\theta^i - \sigma_y^i \rho_y^i y^i \sin\theta^i + \tau_x^i \quad \text{equation} \quad (3)$$

$$y^0 = \sigma_x^i \rho_x^i x^i \sin\theta^i + \sigma_y^i \rho_y^i y^i \cos\theta^i + \tau_y^i \quad \text{equation} \quad (4)$$

where $\theta^i$ is an unknown rotation of the intrinsic coordinate system i with respect to the absolute coordinate system 0, $\sigma_x^i$ and $\sigma_y^i$ are unknown positive scale factors, $\tau_x^i$ and $\tau_y^i$ are unknown translation parameters, and $\sigma_x^i$ and $\sigma_y^i$ are unknown reflection factors having either 1 or −1 values.

GEOMETRIC CONSTRAINTS

The coordinate systems of the leaves in the graphical object structure 40 are linked, directly or indirectly, to each other and to the display through a set of geometric constraints assigned to the component pieces by a user. Each geometric constraint has associated a set of algebraic relationships between parameters that define each of the non-shear coordinate transformations. The geometric constraints exist between two nodes of the graphical object, or between a node and the display. Note that if a geometric constraint involves an interior node, it carries with it an implication that all descendants of that interior node share the same geometric constraint.

Appendix C lists an exemplary set of geometric constraints utilized by the present invention. Each geometric constraint shown in Table III takes the form of "type, from-node, to-node, parameters" where type is the name of the geometric constraint, from-node and to-node are integers between 0 and N indicating the coordinate systems to which the geometric constraint applies, and parameters are data for the geometric constraints. Each type of geometric constraint gives rise to a specific relationship between the from-node and to-node coordinate systems, which in turn has precise algebraic relationships (also referred to herein as "constraint equations") that translate the geometric constraints into statements about unknown transformation parameters of the indicated coordinate transformation. The geometric constraints shown in Appendix C are briefly described below.

TABLE III

| GEOMETRIC CONSTRAINT TYPE | LINEAR EQUALITY CONSTRAINTS |
|---|---|
| exact i j | $\theta^i = \theta^j$ |
| | $\sigma^i_x = \sigma^j_x$ |
| | $\sigma^i_y = \sigma^j_y$ |
| | $\rho^i_x = \rho^j_x$ |
| | $\rho^i_y = \rho^j_y$ |
| | $\tau^i_x = \tau^j_x$ |
| | $\tau^i_y = \tau^j_y$ |
| scale i j α β γ o | $\sigma^i_x \rho^i_x \alpha \cos\theta^i - \sigma^i_y \rho^i_y \beta \sin\theta^i =$ $\sigma^j_x \rho^j_x \gamma \cos\theta^j - \sigma^j_y \rho^j_y o \sin\theta^j$ $\sigma^i_x \rho^i_x \alpha \sin\theta^i + \sigma^i_y \rho^i_y \beta \cos\theta^i =$ $\sigma^j_x \rho^j_x \gamma \sin\theta^j + \sigma^j_y \rho^j_y o \cos\theta^j$ |
| match i j α β γ o | $\sigma^i_x \rho^i_x \alpha \cos\theta^i - \sigma^i_y \rho^i_y \beta \sin\theta^i + \tau^i_x =$ $\sigma^j_x \rho^j_x \gamma \cos\theta^j - \sigma^j_y \rho^j_y o \sin\theta^j + \tau^j_x$ $\sigma^i_x \rho^i_x \alpha \sin\theta^i + \sigma^i_y \rho^i_y \beta \cos\theta^i + \tau^i_x =$ $\sigma^j_x \rho^j_x \gamma \sin\theta^j + \sigma^j_y \rho^j_y o \cos\theta^j + \tau^j_x$ |
| xexact i j | $\theta^i = \theta^j$ |
| | $\sigma^i_x = \sigma^{jx}$ |
| | $\rho^i_x = \rho^{jx}$ |
| | $\tau^i_x = \tau^{jx}$ |
| xscale i j α β | $\theta^i = \theta^j$ |
| | $\sigma^i_x |\alpha| = \sigma^j_x |\beta|$ |

TABLE III-continued

| GEOMETRIC CONSTRAINT TYPE | LINEAR EQUALITY CONSTRAINTS |
|---|---|
| xmatch i j α β | $\rho^i_x \text{ sgn } \alpha = \rho^j_x \text{ sgn } \beta$<br>$\theta^i = \theta^j$ |
| yexact i j | $\sigma^i_x \rho^i_x \alpha + \tau^i_x \cos\theta^i + \tau^i_x \sin\theta^i =$<br>$\sigma^j_x \rho^j_x \beta + \tau^j_x \cos\theta^j + \tau^j_x \sin\theta^j$<br>$\theta^i = \theta^j$<br>$\sigma^i_y = \sigma^j_y$<br>$\rho^i_y = \rho^j_y$<br>$\tau^i_y = \tau^j_y$ |
| yscale i j α β | $\theta^i = \theta^j$<br>$\sigma^i_y |\alpha| = \sigma^j_y |\beta|$<br>$\rho^i_y \text{ sgn } \alpha = \rho^j_y \text{ sgn } \beta$ |
| ymatch i j α β | $\theta^i = \theta^j$<br>$\sigma^i_y \rho^i_y \alpha - \tau^i_x \sin\theta^i + \tau^i_y \cos\theta^i =$<br>$\sigma^j_y \rho^j_y \beta - \tau^j_x \sin\theta^j + \tau^j_y \cos\theta^j$ |
| xyexact i j | $\theta^i = \Pi/2 = \theta^j$<br>$\sigma^i_x = \sigma^j_y$<br>$\rho^i_x = \rho^j_y$<br>$\tau^i_x = \tau^j_y$ |
| xyscale i j α β | $\theta^i - \Pi/2 = \theta^j$<br>$\sigma^i_x |\alpha| = \sigma^j_y |\beta|$<br>$\rho^i_x \text{ sgn } \alpha = \rho^j_y \text{ sgn } \beta$ |
| xymatch i j α β | $\theta^i - \Pi/2 = \theta^j$<br>$\sigma^i_x \rho^i_x \alpha + \tau^i_x \cos\theta^i + \tau^i_y \sin\theta^i =$<br>$\sigma^j_y \rho^j_y \beta - \tau^j_y \sin\theta^j + \tau^j_y \cos\theta^j$ |
| yxexact i j | $\theta^i + \Pi/2 = \theta^j$<br>$\theta^i_y = \sigma^j_x$<br>$\rho^i_y = \rho^j_x$<br>$\tau^i_y = \tau^j_x$ |
| yxscale i j α β | $\theta^i + \Pi/2 = \theta^j$<br>$\sigma^i_y |\alpha| = \sigma^j_x |\beta|$<br>$\rho^i_y \text{ sgn } \alpha = \rho^j_x \text{ sgn } \beta$ |
| yxmatch i j α β | $\theta^i + \Pi/2 = \theta^j$<br>$\sigma^i_x \rho^i_x \alpha - \tau^i_x \sin\theta^i + \tau^i_y \cos\theta^i =$<br>$\sigma^j_y \rho^j_y \beta + \tau^j_x \cos\theta^j + \tau^j_y \sin\theta^j$ |
| aspect i j α β<br>for j = 0 only | $\sigma^i_x \rho^i_x \beta \cos\theta^i - \sigma^i_y \rho^i_y \beta =$<br>$\sigma^i_x \rho^i_x \sin\theta^i + \sigma^i_y \rho^i_y \alpha \cos\theta^i$ |
| rotate i j α | $\theta^i + \alpha = \theta^j \text{ (mod } \Pi)$ |

Geometric constraints of the present invention can be derived in such a way as to allow all rotation and reflection parameters, $\theta^i$, $\rho^i_x$ and $\rho^i_y$, to be solved first using known transformation parameters for the absolute coordinate system 0 of the display. In a preferred embodiment of the present invention, the transformation parameters for the display device are as follow:

$$\theta^0 = 0; \rho_x^0 = \rho_y^0 = 1; \tau_y^0 = 0.$$

Once the transformation parameters $\theta^i$, $\rho_x^i$ and $\rho_y^i$ are solved, the remaining transformation parameters can be solved in a linear programming setting. Solving a linear programming problem generally involves linear equalities, linear inequalities and a cost function. The following describes the set up of the linear programming problem to enable calculation of the remaining transformation parameters and coordinate transformations.

EXACT, SCALE, MATCH AND RELATED CONSTRAINTS

A first geometric constraint given in Appendix C is referred to as the exact constraint. When the coordinate systems of two nodes are identical, this condition is expressed through an exact constraint. Equations for the constraint indicate that each parameter associated with an intrinsic coordinate system i is equal to the corresponding parameter for a coordinate system j. Thus, the rotation, scale, reflection and translation parameters are set equal for both coordinate systems i and j by the following constraint equations for exact:

$$\theta^i = \theta^j; \sigma_x^i = \sigma_x^j; \sigma_y^i = \sigma_y^j;$$

$$\rho_x^i = \rho_x^j; \rho_y^i = \rho_y^j; \tau_x^i = \tau_x^j; \tau_y^i = \tau_y^j.$$

The exact constraint has a significant role in constraint resolution. As mentioned earlier, an interior node and its descendants share the same coordinate system whenever the interior node is involved in at least one geometric constraint. In other words, an exact constraint can be said to exist among the descendants. It necessarily follows that if interior node i is related to another i interior node (or leaf) j by some geometric constraint C, all descendants of interior node i will also be related to the interior node (or leaf) j by the same geometric constraint C. Additionally, all descendants of interior node j will also be related to all descendants of interior node i by the geometric constraint C. The net result is that the geometric constraint C exists only between leaves or between a leaf and the display without the user specifying the same geometric constraint C for each descendant. This point can be illustrated using the graphical object structure 40 depicted in FIG. 2. For example, a user assigns a geometric constraint C between interior nodes 1 and 2. Applying the above principle, descendant nodes 4, 5 and 6 and descendants 7, 8 and 9 can be said to share the same coordinate systems as interior nodes 1 and 2, respectively. Therefore, descendants 4, 5 and 6 are related to descendants 7, 8 and 9 by the same geometric constraint C. This can be simplified by saying that nodes 4 and 7 are related by constraint C, and that each node pair 4 and 5, 4 and 6, 7 and 8, 7 and 9, is related by an "equal" constraint.

A general scaling between two coordinate systems can be specified with a geometric constraint in the form of scale i j α β γ δ. This constraint indicates that α horizontal run of α and a vertical rise of β in intrinsic coordinate system i corresponds to a horizontal run γ and vertical rise δ in coordinate system j. The following constraint equations for scale relate units of length along the x- and y-axes in intrinsic coordinate system i to equal units of length along the x- and y-axes, respectively, in coordinate system j:

$$\sigma_x^i \rho_x^i \alpha \cos\theta^i - \sigma_y^i \rho_y^i \beta \sin\theta^i = \sigma_x^j \rho_x^j \gamma \cos\theta^j - \sigma_y^j \rho_y^j \delta \sin\theta^j;$$

$$\sigma_x^i \rho_x^i \alpha \sin\theta^i + \sigma_y^i \rho_y^i \beta \cos\theta^i = \sigma_x^j \rho_x^j \gamma \sin\theta j + \sigma_y^j \rho_y^j 67 \cos\theta^j.$$

Note that this geometric constraint may only be realized in the context of the non-shear condition.

The coordinates of a single position in two coordinate systems can be established with a geometric constraint in the form of match i j α β γ δ. This means that a point (α, β) in intrinsic coordinate system i is the same spot in the absolute coordinate system as a point (γ,δ) in coordinate system j. This condition may be expressed by the following constraint equations:

$$\sigma_x^i \rho_x^i \alpha \cos\theta^i = \sigma_y^i \rho_y^i \beta \sin\theta^i + \tau_x^i = \sigma_x^j \rho_x^j \gamma \cos\theta^j - \sigma_y^j \rho_y^j \delta \sin\theta^j + \tau_x^j;$$

$$\sigma_x^i \rho_x^i \alpha \sin\theta^i + \sigma_y^i \rho_y^i \beta \cos\theta^i + \tau_x^i = \sigma_x^j \rho_x^j \gamma \sin\theta^j + \sigma_y^j \rho_y^j \delta \cos\theta^j + \tau_x^j.$$

Other related constraints, the xexact, xscale and xmatch constraints, are analogous to the exact, scale and match constraints. The difference is that the former set of geometric constraints only apply in the horizontal direction in the two coordinates systems. This implies that the x-axis in the two systems are parallel, and because of the non-shear condition, are rotated by the same amount from the horizontal direction of the display, i.e., $\theta^i = \theta^j$.

The xexact constraint describes the two x-axes in the i and j coordinate systems not only to be parallel, but also exactly coincident. This means that the two x-axes have the same origin, same unit size and same positive direction. Thus, the constraint equations state that the rotation, scale, reflection and translation are the same only along the x-axis for coordinate systems i and j.

The xscale constraint only demands that an interval of length $\alpha$ along the x-axis in intrinsic coordinate system i is the same as an interval of length $\beta$ along the x-axis in coordinate system j. The xmatch constraint matches the point $\alpha$ along the x-axis in intrinsic coordinate system i to point $\beta$ along the x-axis in coordinate system j.

The yexact, yscale and ymatch constraints are exactly analogous to the xexact, xscale and xmatch constraints except that the former set of geometric constraints operates on the y-axis of the two coordinate systems instead of the x-axis.

When the x-axis of intrinsic coordinate system i is parallel to the y-axis of coordinate system j, then the coordinate systems need to be rotated $\pi/2$ with respect to each other such that the x-axis and y-axis in intrinsic coordinate system i are parallel to the x-axis and y-axis in coordinate system j, respectively. The geometric constraints xyexact, xyscale and xymatch are designed to do just such. The convention made here is that intrinsic coordinate system i is rotated $\pi/2$ more than coordinate system j.

Conversely, the geometric constraints yxexact, yxscale and yxmatch rotate intrinsic coordinate system i $\pi/2$ less than coordinate system j.

ASPECT CONSTRAINT

An important control in statistical graphics is the aspect ratio. The aspect ratio is the proportion of the height to the width of a certain box or, equivalently, the slope of a certain line segment, such as the diagonal of the box beginning at the lower left corner and ending at the point (1, 1). The aspect constraint states that a line segment of slope $\alpha$ in intrinsic coordinate system i and a line segment of slope $\beta$ in coordinate system j must have the same actual slope in absolute coordinates when drawn. However, this constraint is often too general and leads to equations that are non-linear in the unknown parameters. Therefore, coordinate system j is restricted to be the absolute coordinate system, i.e., j=0. The constraint equation for aspect (for j =0) is as follows:

$$\sigma_x^i \rho_x^i \beta \cos\theta^i - \sigma_y^i \rho_y^i \alpha\beta \sin\theta^i = \sigma_x^i \rho_x^i \sin\theta^i + \sigma_y^i \rho_y^i \alpha \cos\theta^i.$$

ROTATE CONSTRAINT

A final geometric constraint in Appendix C is the rotate constraint. This geometric constraint states that intrinsic coordinate system i must be rotated by an angle $\alpha$ more than coordinate system j. Note that the non-shear condition is needed in order for this constraint to be applicable. The constraint equation for rotate is as follows:

$$\theta^i + \alpha = \theta^j \pmod{\pi}.$$

Using the constraint equations and the known transformation parameters $\theta^0$, $\rho_x^0$ and $\rho_y^0$ for the display, the values for the transformation parameters $\theta^i$, $\rho_x^i$ and $\rho_y^i$ may be determined in advance and independently of the remaining unknown transformation parameters. Additionally, the constraint equations provide the linear equalities for solving the remaining unknown transformation parameters $\sigma_x^i$, $\sigma_y^i$, $\tau_x^i$, $\tau_y^i$ in a linear programming setting.

BOUNDING BOXES

In some cases, the constraint equations provided by the geometric constraints are enough to solve the linear programming problem to compute all of the initially unknown transformation parameters and specify where every component piece is placed on the display. In other cases, this is not enough and, at the very least, an overall scaling is missing. In the latter cases, bounding boxes are used to define linear inequality constraints for solving the linear programming problem. Each leaf of the graphical object structure has a rendering bounding box associated with it. The rendering bounding box is the smallest rectangular box oriented with the axes of the absolute coordinate system enclosing the rendered object, which includes all the ink around the geometric points. The left edge of the rendering bounding box is the edge that extends farthest in the negative x-axis direction. Likewise, the right edge, top edge and bottom edge of the rendering bounding box are the edges that extend farthest in the positive x-axis direction, positive y-axis direction and negative y-axis direction, respectively.

Figure 3:
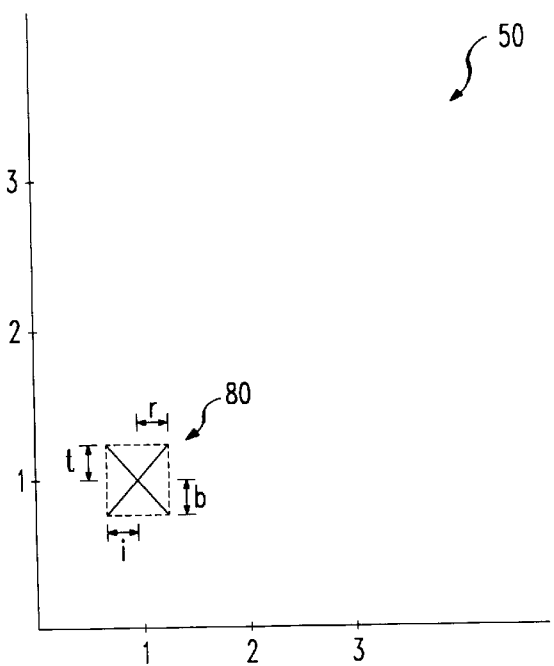
FIG. 3 depicts an "X" mark plotted at coordinate (1, 1) in a absolute coordinate system of a display.

Referring to FIG. 3, there is illustrated a plot of a mark 80 positioned at coordinate (1, 1) in the absolute coordinate system of the display. The mark 80 extends a width of $1^{iz}$ units to the left of coordinate (1, 1), where $1^{iz}$ represents the absolute units that the rendered item z=1, . . . , M of drawing element i that extends in the negative x-axis direction from the coordinate point. The width $1^{iz}$ depends on the rendering data, such as point size, font, text rotation and text adjust. The manner in which $1^{iz}$ is determined is well known in the art. Noting that $1^{iz}$ is expressed in absolute units, wherein the geometric data must be also be expressed as absolute coordinates and using equation (3), the left edge of the rendering bounding box for any item z can be expressed in terms of a point along the x-axis as:

$$x^{iz}\sigma_x^i \rho_x^i \cos\theta^i + y^{iz}\sigma_y^i \rho_y^i \sin\theta^i + \tau_x^i - 1^{iz} \text{ equation} \quad (5).$$

The display also has a bounding box in which all rendering bounding boxes must fit. The left edge of the display bounding box is $X_{min}$, i.e., most negative point along the x-axis. $X_{min}$ is usually equal to zero, corresponding to the left edge of the display, but margins are allowable such that $X_{min} > 0$. Since the rendering bounding boxes must fit within the display bounding box, then the left edge of the rendering bounding box must be greater or equal to the left edge of the display bounding box. This relationship can be expressed by the following linear inequality:

$$x^{iz}\sigma_x^i \rho_x^i \cos\theta^i - y^{iz}\sigma_y^i \rho_y^i \sin\theta^i + \tau_x^i - 1^{iz} \geq X_{min} \text{ equation} \quad (6).$$

Likewise, the right, bottom and top edges of the rendering bounding box must fit within the right, bottom and top edges of the display bounding box and are expressed by the following linear inequalities, respectively:

$$x^{iz}\sigma_x^i \rho_x^i \cos\theta^i - y^{iz}\sigma_y^i \rho_y^i \sin\theta^i + \tau_x^i + r^{iz} \leq X_{max} \text{ equation} \quad (7)$$

$$x^{iz}\sigma_x^i \rho_x^i \sin\theta^i + y^{iz}\sigma_y^i \rho_y^i \cos\theta^i + \tau_y^i - b^{iz} \geq Y_{min} \text{ equation} \quad (8)$$

$$x^{iz}\sigma_x^i \rho_x^i \cos\theta^i + y^{iz}\sigma_y^i \rho_y^i \cos\theta^i + \tau_y^i + t^{iz} \leq Y_{max} \text{ equation} \quad (9)$$

where $r^{iz}$, $b^{iz}$ and $t^{iz}$ represent the absolute units the rendered item z of the drawing element i extends in the positive x-axis direction, negative y-axis direction and positive y-axis direction, respectively, from the corresponding coordinate points. $X_{max}$, $Y_{min}$ and $Y_{max}$ represent the right, bottom and top edge of the display bounding box, respectively. Thus, each rendered drawing element has associated, at least, a set of four values $(x^{iz}, y^{iz}, 1^{iz}), (x^{iz}, y^{iz}, r^{iz}), (x^{iz}, y^{iz}, b^{iz})$ and $(x^{iz}, y^{iz}, t^{iz})$, referred to as triples. These specific sets of triples are collectively referred to herein as a set of four $(x^{iz}, y^{iz}, w^{iz})$ triples, where $w^{iz}$ corresponds to rendered width and height information, i.e., $1^{iz}, r^{iz}, b^{iz}$ and $t^{iz}$. There is a set of four $(x^{iz}, y^{iz}, w^{iz})$ triples for each item z in the intrinsic coordinate system i of a leaf. An important thing to note is that the data for all these linear inequalities implicitly defines the rendering bounding box without actually computing the coordinate transformation $T_i$.

REDUCTION OF LINEAR INEQUALITIES

The number of linear inequalities that arise from the above example and are described with respect to FIG. 3 is potentially quite large. Consider, for example, a leaf that consists of 1,000 marks being plotted, i.e., there are 1,000 items z. The rendering bounding box for this leaf consists of 4,000 ($x^{iz}$, $y^{iz}$, $w^{iz}$) triples giving rise to 4,000 linear inequalities. There is, however, a way to reduce the number of ($x^{iz}$, $y^{iz}$, $w^{iz}$) triples and linear inequalities by applying the concept of convex hull, which is well-known to a person of ordinary skill in the art.

Consider reducing the number of ($x^{iz}$, $y^{iz}$, $w^{iz}$) triples corresponding to the left edge of the rendering bounding box. Using equation (6) and letting $f^{iz}=x^{iz}\rho_x{}^i\cos\theta^i$, $g^{iz}=-y^{iz}\rho_y{}^i\sin\theta^i$ and $h^{iz}=-w^{iz}$, the following equation is obtained:

$$\sigma_x{}^i f^{iz}+\sigma_y{}^i g^{iz}+h^{iz}+\tau_x{}^i \geq X_{min} \text{ equation} \tag{10}$$

Note that $f^{iz}$, $g^{iz}$ and $h^{iz}$ (also collectively referred to herein as "(f, g, h) triples") comprise transformation parameters, which are solvable in advance and independently of the remaining unknown transformation parameters. For given values of $\sigma_x{}^i$, $\sigma_y{}^i$ and $\tau_x{}^i$, a left edge of the rendering bounding box will be determined by the item z that potentially minimizes the equation $\sigma_x{}^i f^{iz} + \sigma_y{}^i g^{iz} + h^{iz} 30 \tau_x{}^i$ for the intrinsic coordinate system i of a leaf. This indicates that the plane with normal ($\sigma_x{}^i$, $\sigma_y{}^i$, 1) passing through ($f^i$, $g^i$, $h^i$) has all the (f, g, h) triples on or to one side of it, which implies that ($f^i$, $g^i$, $h^i$) is an extreme point or on the boundary of the convex hull of the (f, g, h) triples.

Since $\sigma_x{}^i$ and $\sigma_y{}^i$ are constrained to be positive, this is a special kind of extreme point called a "least extreme point", that is, a vertex of a "least face" of the boundary of the convex hull of the (f, g, h) triples or a face whose outward pointing normal has all non-positive components. The convex hull for determining the items z of the drawing elements i that potentially minimize $\sigma_x{}^i x^{iz}\rho_x{}^i\cos\theta^i - \sigma_y{}^i y^{iz}\rho_y{}^i\sin\theta^i - \tau_x{}^i - 1^{iz}$ (i.e., left edge of the rendering bounding box) has the points ($x^{iz}\rho_x{}^i\cos\theta^i$, $-y^{iz}\rho_y{}^i\sin\theta^i$, $-1^{iz}$). Similarly, the convex hull for determining the items z of the drawing elements i that: potentially maximize $x^{iz}\sigma_x{}^i\rho_x{}^i\cos\theta^i - y^{iz}\sigma_y{}^i\rho_y{}^i\sin\theta^i + \tau_x{}^i + r^{iz}$ (i.e., right edge of the rendering bounding box) has the points ($-x^{iz}\rho_x{}^i\cos\theta^i$, $y^{iz}\sigma_y{}^i\rho_y{}^i\sin\theta^i$, $-r^{iz}$); potentially minimize $x^{iz}\sigma_x{}^i\rho_x{}^i\sin\theta^i + y^{iz}\sigma_y{}^i\rho_y{}^i\cos\theta^i + \tau_y{}^i - b^{iz}$ (i.e., bottom edge of the rendering bounding box) has the points ($x^{iz}\rho_x{}^i\sin\theta^i$, $y^{iz}\rho_y{}^i\cos\theta^i$, $-b^{iz}$); and potentially maximize $x^{iz}\sigma_x{}^i\rho_x{}^i\sin\theta^i + y^{iz}\sigma_y{}^i\rho_y{}^i\cos\theta^i + \tau_y{}^i + t^{iz}$ (i.e., top edge of the rendering bounding box) has the points ($-x^{iz}\rho_x{}^i\sin\theta^i$, $-y^{iz}\rho_y{}^i\cos\theta^i$, $-t^{iz}$).

Applying the concept of the convex hull reduces any set of ($x^{iz}$, $y^{iz}$, $w^{iz}$) triples to a smaller, equivalent set by selecting only those points for which the corresponding ($f^i$, $g^i$, $h^i$) triple is a least extreme point of all the (f, g, h) triples. It will usually be the case that the reduction is quite dramatic. A common example is when $\theta^i=0$ and all the $w^{iz}$ are equal. The original sets of four ($x^{iz}$, $y^{iz}$, $w^{iz}$) triples are reduced to just one set of four ($x^{iz}$, $y^{iz}$, $w^{iz}$) triple, thus leaf i will only have four linear inequalities.

SOLVING FOR REMAINING TRANSFORMATION PARAMETERS

Using the above-described geometric constraints and linear inequalities, the linear programming problem described previously is now solvable. Applying a cost function and using the solved values for the $\theta^i$, $\rho_x{}^i$ and $\rho_y{}^i$ parameters, the linear equalities from the geometric constraints and the linear inequalities defining the rendering bounding boxes, a linear programming solver, such as that described in section 10.8 of "*Numerical Recipes in C*" by Press, et. al., published by Cambridge University Press in 1988, can compute the remaining unknown transformation parameters $\sigma_x{}^i$, $\sigma_y{}^i$, $\tau_x{}^i$ and $\tau_y{}^i$, such that all the transformation parameters are simultaneously satisfied. A goal of the present invention is to make the pieces of the graphical object as large as possible on the display while satisfying all the constraints. A cost function meeting these requirements simply maximizes the sum of the widths and heights of the rendering bounding boxes.

Once the coordinate transformations for each drawing element of an intrinsic coordinate system i are computed, the graphical object can be rendered onto a display device. The manner in which graphical objects are rendered is well known in the art. See, for example, "*Computer Graphics: Principles and Practice, Second Edition*" by Foley and Van Dam, published by Addison Wesley in 1990.

EXEMPLARY IMPLEMENTATION

Figure 4:
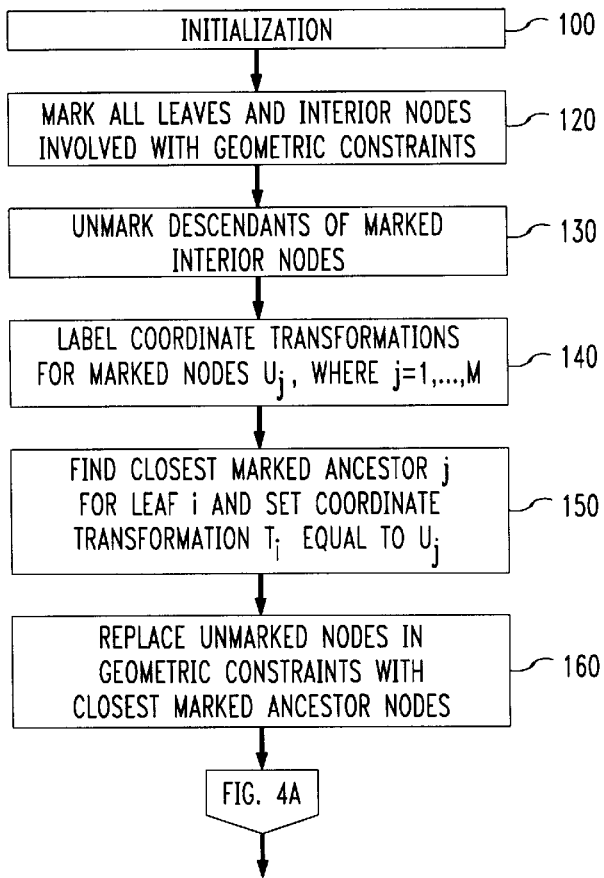
FIGS. 4–4c depicts an exemplary flowchart for computing the coordinate transformations $T_i$.
Figure 4A:
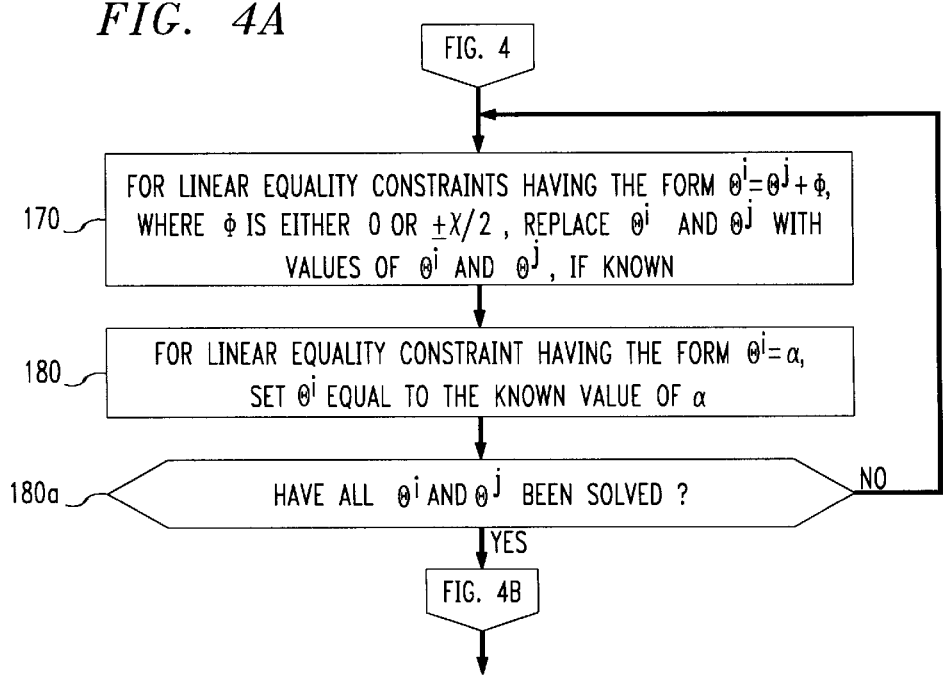
Figure 4B:
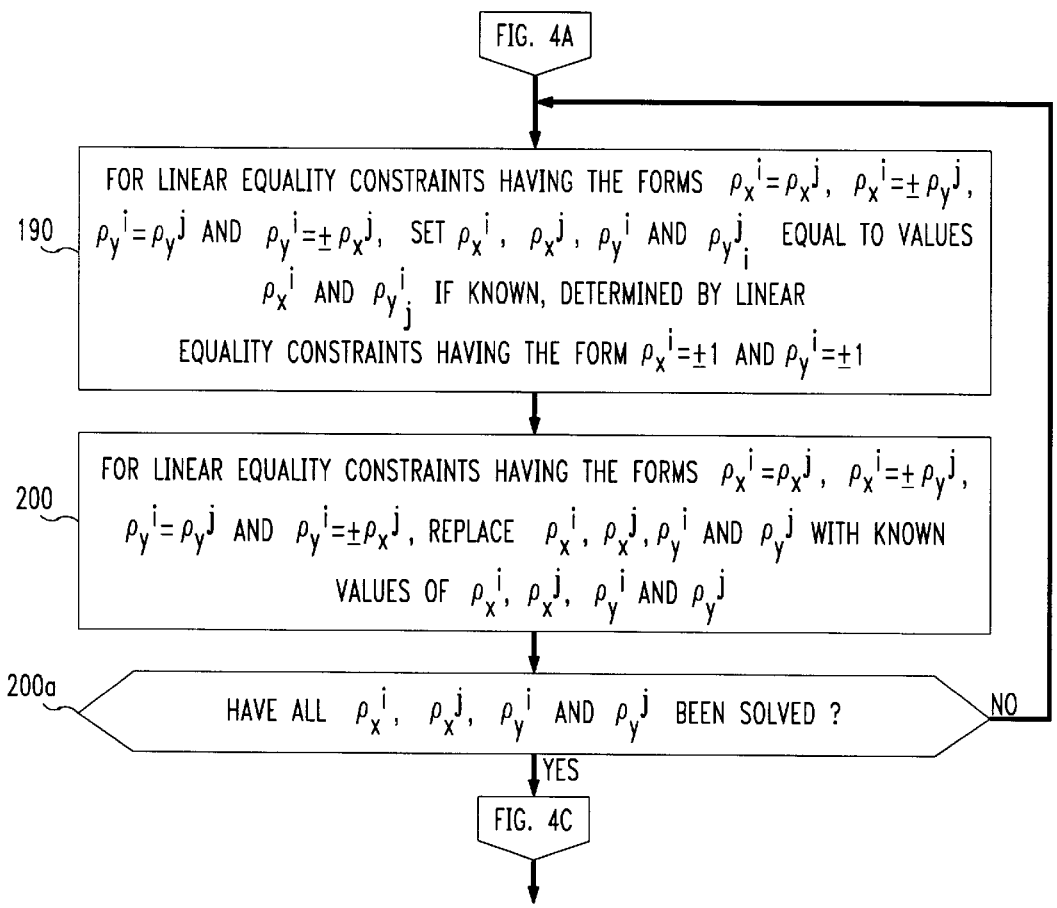
Figure 4C:
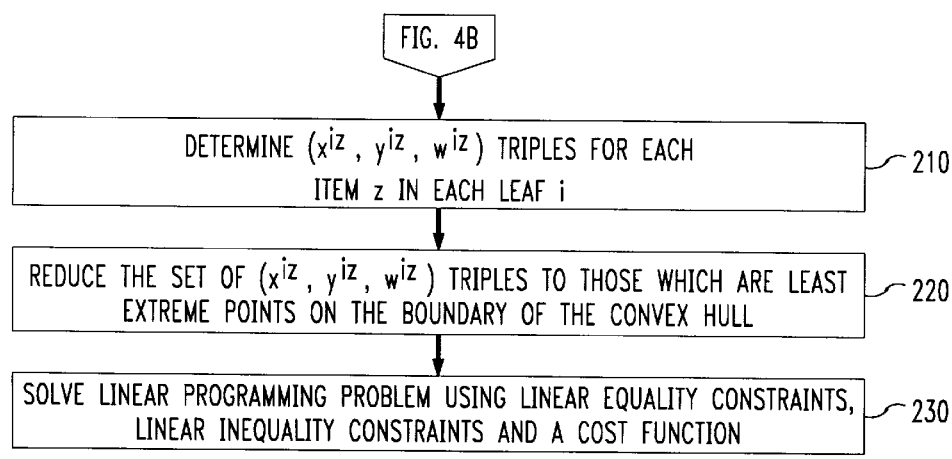

Referring to FIGS. 4–4c, an exemplary flow diagram is shown for computing coordinate transformations according to the present invention. For illustration purposes, the execution of the coordinate transformations will be described with respect to the bar graph 30 of FIG. 1.

A first step 100 in carrying out the present invention method is to initialize the linear programming problem. Before step 100 can be performed, a user must first relate the component pieces of the bar chart 30 using the geometric constraints. From FIGS. 1 and 2, it can be seen that the x-axes for node 1 (i.e., x-axis) and node 3 (i.e., bars) are exactly the same. The constraint "xexact 1 3" is assigned to describe this relationship between the nodes 1 and 3. However, the y-axes of leaf 1 and leaf 3 are not the same, rather a point 0 along the y-axis of node 1 matches a point 10 along the y-axis of node 3. Thus, "ymatch 1 3 0 10" is assigned. Similarly, other constraints are assigned as follows to describe the remainder of the plot: "yexact 2 3"; "yscale 1 0 1 12/72"; "xmatch 2 3 0 0"; and "xscale 2 0 1 12/72".

From these six geometric constraints, eighteen linear constraint equations are produced. Thus, these six geometric constraints relate the coordinate systems of each leaf directly or indirectly to the absolute coordinate system of the display. Note that, in this example, leaves 4–9 did not need to be specifically assigned geometric constraints. This is because their ancestor interior nodes have constraints which tied them to other leaves in the graphical object structure. Once the geometric constraints have been assigned, the coordinate transformation can now be computed. Advantageously, unlike the prior art techniques, the present invention does not require the user to specify where each component piece or leaf will be plotted on the display in order to compute the transformation parameters necessary to perform the coordinate transformation $T_i$.

Once the component pieces of the bar chart 30 are related using the geometric constraints, the initialization of step 100 can be executed. In step 100, the present invention is initialized. Specifically, initialization of the present invention method is accomplished by reading in data for, e.g., the six assigned geometric constraints (and eighteen associated constraint equations), drawing instructions associated with each leaf and the known values for the display. Generally, for each leaf, a coordinate transformation $T_i$ is required. Each coordinate transformation $T_i$ of the present invention has seven initially unknown transformation parameters: $\sigma_x^i$, $\sigma_y^i$, $\rho_x^i$, $\rho_y^i$, $\tau_x^i$, $\tau_y^i$ and $\theta^i$. Since there are seven leaves in this example, i.e., leaves 3–9, a total of forty-nine initially unknown transformation parameters need to be solved such that the corresponding constraint equations and linear inequalities are simultaneously satisfied. Upon solving for the transformation parameters, the coordinate transformations $T_i$ can be performed.

In steps 120–160, the number of initially unknown transformation parameters are reduced by simplifying the geometric constraints. In step 120, all the leaves and all interior nodes involved in geometric constraints are marked or noted, thus leaves 3–9 and interior nodes 1 and 2 are marked. Note that although leaves 4–9 were not assigned geometric constraints, they are involved in geometric constraints as a result of their relationship to ancestor nodes. In step 130, descendants of marked interior nodes are unmarked leaving only leaf 3 and interior nodes 1 and 2 marked. In step 140 the coordinate transformations for the marked nodes $U_j$ are labeled, where the subscript $j=1, \ldots, M$ represent the marked node, thus nodes 1, 2 and 3 are marked $U_1$, $U_2$ and $U_3$, respectively.

In step 150, the closest marked ancestor $j$ of leaf $i$ is found and the leaf coordinate transformation $T_i$ are set equal to $U_j$. This step applies the principle that the existence of a geometric constraint involving an interior node also means that all descendants of that interior node share the same coordinate system as the interior node. It necessarily follows that all descendants share the same coordinate transformation as the interior node. Therefore, coordinate transformations $T_4$, $T_5$ and $T_6$ (for leaves 4, 5 and 6, respectively) are set equal to $U_1$ and $T_7$, $T_8$ and $T_9$ (for leaves 7, 8 and 9, respectively) are set equal to $U_2$. Since the closest marked ancestor for leaf 3 is itself, then $T_3$ is set equal to $U_3$. The number of coordinate transformations $T_i$ have been reduced from seven (number of leaves) to three (number of marked nodes). Thus, the number of initially unknown parameters have been reduced from forty-nine to twenty-one.

In order to be consistent with step 150, all geometric constraints involving unmarked nodes must be replaced with marked nodes. Specifically, the from-node and to-node parts of each geometric constraint are changed in step 160 by replacing from-node and to-node with the node number of its closest marked ancestor or itself if it is already marked. In the example using FIGS. 1 and 2, there are no unmarked nodes specified in any of the geometric constraints. If there were, such as xexact 5 3, then step 6 would have replaced all mention of unmarked node 5 with its closest marked ancestor interior node 1, thus xexact 5 3 becomes xexact 1 3.

The constraint equations used for solving rotations $\theta^i$ and $\theta^j$ (hereinafter referred to as "rotation equations") take one of two forms: (i) $\theta^i = \alpha$ or (ii) $\theta^i = \theta^j + \Phi$, where $\alpha$ is a known value and $\Phi$ is either 0 or $\pm\pi/2$. Using the known rotation $\theta^0$ for the absolute coordinate system (i.e., $\theta^0 = 0$) and the rotation equations from step 100, the rotations $\theta^1$, $\theta^2$ and $\theta^3$ can be computed in advance and independently of the remaining unknown parameters. In step 170, each type (i) rotation equation is processed by substituting $\alpha$ with its known value. Subsequently, in step 180 each type (ii) rotation equation is processed by substituting $\theta^i$ and $\theta^j$ with values of $\theta^i$ and $\theta^j$ solved by the previous step(s). In step 180a, it is determined whether all $\theta^i$ and $\theta^j$ have been computed. If not, steps 170 and 180 are repeated until all $\theta^i$ and $\theta^j$ have been solved. Otherwise, the present invention proceeds to step 190. Applying these steps to the example results in the following: $\theta^1 = \theta^2 = \theta^3 = 0$.

The constraint equations involving reflections $\rho_x^i$ and $\rho_y^i$ (hereinafter referred to as "reflection equations") take one of three forms: (i) $\rho_x^i = \pm\rho_x^j$ (or $\rho_y^i = \pm\rho_y^j$); (ii) $\rho_x^i = \pm\rho_y^j$ ($\rho_y^i = \pm\rho_x^j$); or (iii) $\rho_x^i = \pm 1$ (or $\rho_y^i = \pm 1$). Using the rotation equations defined by the geometric constraints applied in this example, along with the knowledge that $\rho_x^0 = \rho_y^0 = 0$, each $\rho_x^i$, $\rho_x^j$, $\rho_y^i$ and $\rho_y^i$ are solved in steps 190, 200 and 200a in a method analogous to solving for $\theta^i$ and $\theta^j$ in steps 170, 180 and 180a. Specifically, in step 190, each type (i) and (ii) rotation equation is processed by substituting for $\rho_x^i$, $\rho_x^j$, $\rho_y^i$ and $\rho_y^j$ with the value obtained from the type (iii) rotation equation. Subsequently, in step 200, each type (i) and type (ii) rotation equation is processed by substituting $\rho_x^i$, $\rho_x^j$, $\rho_y^i$ and $\rho_y^j$ with values of $\rho_x^i$, $\rho_x^j$, $\rho_y^i$ and $\rho_y^j$ solved by the previous step(s). In step 200a, a check is performed to determine whether all $\rho_x^i$, $\rho_x^j$, $\rho_y^i$ and $\rho_y^j$ parameters have been computed. If not, steps 190 and 200 are repeated until all $\rho_x^i$, $\rho_x^j$, $\rho_y^i$ and $\rho_y^j$ parameters have been solved. Otherwise, the present invention proceeds to step 210. Applying steps 190, 200 and 200a to the example result in the following: $\rho_x^1 = \rho_x^3 = \rho_y^2 = \rho_y^3 = 1$ and $\rho_x^2 = \rho_y^1 = -1$.

At this point in the example, nine of the twenty-one initially unknown parameters have been solved. Thus, twelve unknown parameters remain: $\sigma_x^1$, $\sigma_y^1$, $\tau_x^1$, $\tau_y^1$, $\sigma_x^2$, $\sigma_y^2$, $\tau_x^2$, $\tau_y^2$, $\sigma_x^3$, $\sigma_y^3$, $\tau_x^3$ and $\tau_y^3$. However, there are now only eight constraint equations remaining, not including the rotation and reflection equations. These constraint equations now become the linear equalities in a linear programming problem for the twelve remaining unknown parameters.

In steps 210–220, the linear inequalities needed to solve the linear programming problem are defined. As mentioned earlier, the rendering bounding boxes of leaf $i$ should fit within the display to allow the entire plot to be generated on the display. There is a fixed bounding box in the display coordinate system with the lower left corner ($X_{min}$, $Y_{min}$) and the upper right corner ($X_{max}$, $Y_{max}$). This is intended to represent the visible display area. If the rendering bounding box for each leaf $i$ is written in absolute coordinates, then the following must be satisfied:

$$X_{min}^i \geq X_{min}; Y_{min}^i \geq Y_{min}; X_{max}^i \leq X_{max}; Y_{max}^i \leq X_{max}.$$

However, when there are $z$ items in a leaf $i$, it is not always clear which item $z$ extends farthest to the left, right, top or bottom. Therefore, in step 210 the ($x^{iz}$, $y_{iz}$, $w^{iz}$) triples for each item $z$ in leaf $i$ must be determined using the geometric and rendering data contained in the drawing instructions. Upon completion of step 210, step 220 is performed to find the ($x^{iz}$, $y^{iz}$, $w^{iz}$) triples that are least extreme points on the boundary of the convex hull, as is well known in the art, thus reducing the number of candidates. From each leaf $i$, at least four linear inequalities are produced defining the relationship between the rendering box for the leaf and the display bounding box.

The consequence of steps 100–220 is that there are now a set of linear equalities and inequalities in the remaining unknown transformation parameters $\sigma_x^i$, $\sigma_y^i$, $\tau_x^i$ and $\tau_y^i = 1, \ldots, M$. These linear equalities and inequalities are solved simultaneously while maximizing the cost function, i.e., $\sigma_x^1 + \sigma_y^1 + \sigma_x^2 + \sigma_y^2 + \ldots + \sigma_x^N + \sigma_Y^N$, in step 230. Maximizing the cost function allows the transformation parameters to be solved such that no visible area of the display is unused. The problem is now a typical linear programming problem which can be solved using any of well-known linear programming solver. Unlike the techniques of the prior art, the transformation parameters and coordinate transformations are not solved until the graphical object is ready to be rendered by the present invention, thereby providing a more flexible methodology used in the creation of graphical objects without requiring pre-specification of display area while maximizing its utilization.

Although the present invention has been described in considerable detail with reference to certain preferred embodiments, other embodiments are also applicable. Therefore, the spirit and scope of the appended claims should not be limited to the description of the preferred embodiments contained herein.

I claim:

1. A method for rendering graphical components on a computing display device having an absolute coordinate system, wherein said graphical components have intrinsic coordinate systems, said method comprising the steps of:

determining a set of geometric constraints for relating said intrinsic coordinate systems of said graphical components to said absolute coordinate system, said intrinsic coordinate systems having initially unknown transformation parameters and said absolute coordinate system having predetermined transformation parameters, wherein said initially unknown transformation parameters and said predetermined transformation parameters include rotation, reflection, scale and translation parameters;

performing a non-shear coordinate transformation for mapping intrinsic coordinates in said intrinsic coordinate systems to absolute coordinates in said absolute coordinate system, wherein said non-shear coordinate transformation enables said initially unknown transformation parameters of said intrinsic coordinate systems to be calculated at a time of rendering said graphical components;

said step of performing a non-shear coordinate transformation includes the steps of:

determining said rotation and reflection parameters of said intrinsic coordinate systems using said geometric constraints and said predetermined transformation parameters of said absolute coordinate system, said geometric constraints including one or more linear equality constraints for defining relationships between said initially unknown transformation parameters of said intrinsic coordinate system and said predetermined transformation parameters of said absolute coordinate system involved in said geometric constraints, said linear equality constraints allowing independent computation of said rotation and reflection parameters of said intrinsic coordinate systems in advance of said scale and translation parameters of said intrinsic coordinate systems;

defining said scale and translation parameters of said intrinsic coordinate systems using said geometric constraints, said predetermined transformation parameters of said absolute coordinate systems and said rotation and reflection parameters of said intrinsic coordinate systems such that all said linear equality constraints are simultaneously satisfied;

said step of performing said non-shear coordinate transformation further includes the step of:

transforming intrinsic coordinates $(x^i, y^i)$ in said intrinsic coordinate systems i for said graphical components denoted by i=1 ..., N into absolute coordinates $(x^o, y^o)$ in said absolute coordinate system according to the corresponding equations $$x^o = \sigma_x^i \rho_x^i x^i \cos\theta^i - \sigma_y^i \rho_y^i y^i \sin\theta^i + \tau_x^i$$

and $$y^o = \sigma_x^i \rho_x^i x^i \sin\theta^i + \sigma_y^i \rho_y^i y^i \cos\theta^i + \tau_y^i$$

where $\theta$ corresponds to said rotation parameter, $\sigma_x$ and $\sigma_y$ are said scale parameters, $\rho_x$ and $\rho_y$ are said reflection parameters, and $\tau_x$ and $\tau_y$ are said translation parameters, and said reflection parameters having either a +1 or −1 value, said scale parameters being positive values;

said step of transforming said intrinsic coordinates further includes the step of:

determining said rotation parameter of said intrinsic coordinate systems using said geometric constraints and a predetermined rotation parameter for said display, said geometric constraints including one or more linear equality constraints for defining relationships between said parameters of coordinate systems involved in said geometric constraints, said linear equality constraints allowing computation of said rotation parameter of said intrinsic coordinate systems in advance and independently of said reflection, scale and translation parameters of said intrinsic coordinate systems, wherein said linear equality constraints include rotation equations having forms $\theta^i = \alpha$ or $\theta^i = \theta^j + \Phi$, where j=0, ..., N denotes a coordinate system other than said intrinsic coordinate system i to which said parameter belongs, a corresponds to a known value and $\Phi$ represents either 0 or $\pm\pi/2$; and displaying said graphical components on said computing display device.

2. A method for rendering graphical components on a computing display device having an absolute coordinate system, wherein said graphical components have intrinsic coordinate systems, said method comprising the steps of:

determining a set of geometric constraints for relating said intrinsic coordinate systems of said graphical components to said absolute coordinate system, said intrinsic coordinate systems having initially unknown transformation parameters and said absolute coordinate system having predetermined transformation parameters, wherein said initially unknown transformation parameters and said predetermined transformation parameters include rotation, reflection, scale and translation parameters;

performing a non-shear coordinate transformation for mapping intrinsic coordinates in said intrinsic coordinate systems to absolute coordinates in said absolute coordinate system, wherein said non-shear coordinate transformation enables said initially unknown transformation parameters of said intrinsic coordinate systems to be calculated at a time of rendering said graphical components;

said step of performing a non-shear coordinate transformation includes the steps of:

determining said rotation and reflection parameters of said intrinsic coordinate systems using said geometric constraints and said predetermined transformation parameters of said absolute coordinate system, said geometric constraints including one or more linear equality constraints for defining relationships between said initially unknown transformation parameters of said intrinsic coordinate system and said predetermined transformation parameters of said absolute coordinate system involved in said geometric constraints, said linear equality constraints allowing independent computation of said rotation and reflection parameters of said intrinsic coordinate systems in advance of said scale and translation parameters of said intrinsic coordinate systems;

defining said scale and translation parameters of said intrinsic coordinate systems using said geometric constraints, said predetermined transformation parameters of said absolute coordinate system, and said rotation and reflection parameters of said intrinsic coordinate systems such that all said linear equality constraints are simultaneously satisfied;

said step of performing said non-shear coordinate transformation further includes the step of:

transforming intrinsic coordinates $(x^i, y^i)$ in said intrinsic coordinate systems i for said graphical components denoted by i=1, . . . , N into absolute coordinates $(x^0, y_0)$ in said absolute coordinate system according to the corresponding equations $$x^0 = \sigma_x^i \rho_x^i x^i \cos\theta^i - \sigma_y^i \rho_y^i y^i \sin\theta^i + \tau_x^j \text{ and}$$
$$y^0 = \sigma_x^i \rho_x^i x^i \sin\theta^i + \sigma_y^i \rho_y^i y^i \cos\theta^i + \tau_y^j.$$

where $\theta$ corresponds to said rotation parameter, $\sigma_x$ and $\sigma_y$ are said scale parameters, $\rho_x$ and $\rho_y$ are said reflection parameters, and $\tau_x$ and $\tau_y$ are said translation parameters, and said reflection parameters having either a +1 or −1 value, said scale parameters being positive values;

said step of transforming said intrinsic coordinates further includes the step of;

determining said reflection parameters of said intrinsic coordinate systems using predetermined reflection parameters for said display and said geometric constraints, said geometric constraints including one or more linear equality constraints for defining relationships between said parameters of coordinate systems involved in said geometric constraints, said linear equality constraints allowing independent computation of said reflection parameters of said intrinsic coordinate systems in advance of said rotation, scale and translation parameters of said intrinsic coordinate systems, wherein said linear equality constraints include reflection equations having forms $\rho_x^i = \pm \rho_x^j$, $\rho_y^i = \pm \rho_y^j$, $\rho_x^i = \pm \rho_y^j$, $\rho_y^i = \pm \rho_x^j$, $\rho_x^i = \pm 1$ or $\rho_y^i = \pm 1$, where j=0, . . . , N denotes a coordinate system other than said intrinsic coordinate system i to which said parameter belongs; and displaying said graphical components on said computing display device.

3. A method for rendering graphical components on a computing display device having an absolute coordinate system, wherein said graphical components have intrinsic coordinate systems, said method comprising the steps of:

determining a set of geometric constraints for relating said intrinsic coordinate systems of said graphical components to said absolute coordinate system, said intrinsic coordinate systems having initially unknown transformation parameters and said absolute coordinate system having predetermined transformation parameters, wherein said initially unknown transformation parameters and said predetermined transformation parameters include rotation, reflection, scale and translation parameters;

performing a non-shear coordinate transformation for mapping intrinsic coordinates in said intrinsic coordinate systems to absolute coordinates in said absolute coordinate system, wherein said non-shear coordinate transformation enables said initially unknown transformation parameters of said intrinsic coordinate systems to be calculated at a time of rendering said graphical components;

said step of performing a non-shear coordinate transformation includes the steps of:

determining said rotation and reflection parameters of said intrinsic coordinate systems using said geometric constraints and said predetermined transformation parameters of said absolute coordinate system, said geometric constraints including one or more linear equality constraints for defining relationships between said initially unknown transformation parameters of said intrinsic coordinate system and said predetermined transformation parameters of said absolute coordinate system involved in said geometric constraints, said linear equality constraints allowing independent computation of said rotation and reflection parameters of said intrinsic coordinate systems in advance of said scale and translation parameters of said intrinsic coordinate systems;

defining said scale and translation parameters of said intrinsic coordinate systems using said geometric constraints, said predetermined transformation parameters of said absolute coordinate system, and said rotation and reflection parameters of said intrinsic coordinate systems such that all said linear equality constraints are simultaneously satisfied;

said step of performing said non-shear coordinate transformation further includes the step of:

transforming intrinsic coordinates $(x^i, y^i)$ in said intrinsic coordinate systems i for said graphical components denoted by i=1, . . . , N into absolute coordinates $(x^0, y^0)$ in said absolute coordinate system according to the corresponding equations $$x^0 = \sigma_x^i \rho_x^i x^i \cos\theta^i - \sigma_y^i \rho_y^i y^i \sin\theta^i + \tau_x^i \text{ and}$$
$$y^0 = \sigma_x^i \rho_x^i x^i \sin\theta^i + \sigma_y^i \rho_y^i y^i \cos\theta^i + \tau_y^i$$

where $\theta$ corresponds to said rotation parameter, $\sigma_x$ and $\sigma_y$ are said scale parameters, $\rho_x$ and $\rho_y$ are said reflection parameters, and $\tau_x$ and $\tau_y$ are said translation parameters, and said reflection parameters having either a +1 or −1 value, said scale parameters being positive values, wherein said graphical components have items z; where z=1, . . . $M_i$;

determining rendered width and height information for said items z of said graphical components i using rendering data, wherein said coordinate systems have x- and y-axes with positive and negative directions;

determining items z of said graphical components i that extend furthermost in said negative and positive directions of said x- and y-axes in said absolute coordinate system using said rendered width and height information for said items z; and displaying said graphical components on said computing display device.

4. The method of claim 3 wherein the step of determining said items z of said drawing elements i that extend furthermost in said negative and positive directions of said x- and y-axes in said absolute coordinate system further includes the steps of:

determining said items z that potentially minimize $\sigma_x^i x^{iz} \rho_x^i \cos\theta^i - \sigma_y^i y^{iz} \rho_y^i \sin\theta^i + \tau_x^i - 1^{iz}$, where $1^{iz}$ is a quantity said item z extends along said negative direction of said x-axis from coordinate $x^{iz}$ when rendered in said absolute coordinate system;

determining said items z that potentially maximize $x^{iz}\sigma_x^i\rho_x^i\cos\theta^i - y^{iz}\sigma_y^i\rho_y^i\sin\theta^i + \tau_x^i + r^{iz}$, where $r^{iz}$ is a quantity said item z extends along said positive direction of said x-axis from coordinate $x^{iz}$ when rendered in said absolute coordinate system;

determining said items z that potentially minimize $x^{iz}\sigma_x^i\rho_x^i\sin\theta^i + y^{iz}\sigma_y^i\rho_y^i\cos\theta^i + \tau_y^i - b^{iz}$, where $b^{iz}$ is a quantity said item z extends along said negative direction of said y-axis from coordinate $y^{iz}$ when rendered in said absolute coordinate system; and determining said items z that potentially maximize $x^{iz}\sigma_x^i\rho_x^i\sin\theta^i + y^{iz}\sigma_y^i\rho_y^i\cos\theta^i + \tau_y^i + t^{iz}$, where $t^{iz}$ is a quantity said item z extends along said positive direction of said y-axis from coordinate $y^{iz}$ when rendered in said absolute coordinate system.

5. The method of claim 3 wherein the step of determining items z of said graphical components i that extend most in said negative and positive directions of said x- and y-axes in said absolute coordinate system further includes the step of:

determining said items z of said graphical components i that are least extreme points, said least extreme point being a vertex on any least face of a convex hull boundary.

\* \* \* \* \*